US012624820B1

(12) United States Patent
Lee et al.

(10) Patent No.: US 12,624,820 B1
(45) Date of Patent: May 12, 2026

(54) LENS ASSEMBLY AND LIGHTING APPARATUS USING SAME

(71) Applicants: HYUNDAI MOBIS CO., LTD., Seoul (KR); OPTOELEC. CO., LTD, Anyang-si (KR)

(72) Inventors: Kwan Woo Lee, Yongin-si (KR); Sung Min Hong, Siheung-si (KR)

(73) Assignees: HYUNDAI MOBIS CO., LTD., Seoul (KR); OPTOELEC. CO., LTD, Anyang-si (KR)

( * ) Notice: Subject to any disclaimer, the term of this patent is extended or adjusted under 35 U.S.C. 154(b) by 0 days.

(21) Appl. No.: 19/218,035

(22) Filed: May 23, 2025

(30) Foreign Application Priority Data

Mar. 14, 2025    (KR) ........................ 10-2025-0033464

(51) Int. Cl.
| | |
|---|---|
| *F21V 5/02* | (2006.01) |
| *B60Q 3/20* | (2017.01) |
| *B64D 11/00* | (2006.01) |
| *F21V 5/00* | (2018.01) |
| *F21V 5/04* | (2006.01) |

(52) U.S. Cl.
CPC ................. *F21V 5/02* (2013.01); *B60Q 3/20* (2017.02); *B64D 11/00* (2013.01); *F21V 5/004* (2013.01); *F21V 5/005* (2013.01); *F21V 5/008* (2013.01); *F21V 5/04* (2013.01)

(58) Field of Classification Search
CPC ... F21V 5/02; F21V 5/008; F21V 5/04; F21V 5/004; F21V 5/005; F21V 7/06; F21V 7/07; F21V 7/08; B60Q 3/233; B60Q 3/20; B64D 2011/0038; B64D 11/00

USPC ..................................................... 362/311.03
See application file for complete search history.

(56) References Cited

U.S. PATENT DOCUMENTS

| | | | |
|---|---|---|---|
| 11,280,463 B2 | 3/2022 | Moser et al. | |
| 11,808,428 B2 * | 11/2023 | Jung ....................... | F21S 41/43 |
| 2017/0350573 A1 * | 12/2017 | Fleszewski ............. | F21V 7/041 |
| 2021/0262634 A1 | 8/2021 | Lim et al. | |
| 2021/0381673 A1 * | 12/2021 | Lee ......................... | F21S 43/15 |
| 2023/0358388 A1 * | 11/2023 | Kang ...................... | F21V 5/007 |

(Continued)

FOREIGN PATENT DOCUMENTS

| | | |
|---|---|---|
| CN | 116624802 A | 8/2023 |
| DE | 10 2014 112 937 A1 | 3/2016 |
| DE | 10 2020 112 316 A1 | 11/2021 |

(Continued)

OTHER PUBLICATIONS

Extended European Search Report Issued on Oct. 17, 2025, in Counterpart European Patent Application No. 25180875.4 (13 Pages in English).

*Primary Examiner* — Laura K Tso

(74) *Attorney, Agent, or Firm* — NSIP Law

(57) ABSTRACT

A lens assembly includes a light source, a first lens part configured to focus light emitted from the light source, and a second lens part through which the light focused by the first lens part passes, the second lens part including: (i) a light-receiving surface on which fine lenses are arranged; (ii) a light-emitting surface on which fine prisms are arranged; and (iii) a pattern layer disposed between the light-receiving surface and the light-emitting surface, the pattern layer configured to arrange the light passing through the second lens part. The arranged light is emitted through the light-emitting surface.

10 Claims, 5 Drawing Sheets

(56)                        References Cited

U.S. PATENT DOCUMENTS

2024/0200743 A1*   6/2024  Jin  .......................... F21S 41/43
2024/0218992 A1*   7/2024  Park ........................ F21V 5/008

FOREIGN PATENT DOCUMENTS

DE       10 2021 120 990  A1      3/2022
DE       10 2023 124 550  B3     10/2024
FR              3 144 254  A3      6/2024
JP             2023-180529  A     12/2023

* cited by examiner

LENS ASSEMBLY AND LIGHTING APPARATUS USING SAME

CROSS-REFERENCE TO RELATED APPLICATION

This application claims the benefit under 35 U.S.C. § 119(a) of Korean Patent Application No. 10-2025-0033464, filed on Mar. 14, 2025, the entire disclosure of which is incorporated herein by reference for all purposes.

BACKGROUND

1. Field

The present disclosure relates to a lens assembly and a lighting apparatus including the same, and more specifically, to a lens assembly capable of easily controlling emitted light, and a lighting apparatus incorporating the same.

2. Discussion of Related Art

The statements in this section merely provide background information related to the present disclosure and do not necessarily constitute prior art.

Conventional vehicle interior lighting apparatuses are positioned on components such as cockpits, doors, seats, and are implemented using both direct and indirect lighting concepts. In the case of the indirect lighting, light is transmitted to the passenger via reflection from a reflective surface, and the lighting design of the indirect lighting is determined based on the shape and configuration of the reflective surface.

Conventional indirect lighting apparatuses have limitations in that the arrangement direction of a light guide is constrained by the optical design required to achieve lighting uniformity, and other aspects of the lighting design are dictated by the shape of the garnish. As a result, in order to implement a desired lighting design, the shape of the garnish must be modified, or alternatively, the desired lighting design may need to be abandoned.

In the indirect lighting concept, there is a need to improve the design flexibility and autonomy by enabling implementation of a lighting design desired by the designer, through the application of a new lighting module structure that is not constrained by the shape of the garnish.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example of the present disclosure is directed to providing a lens assembly capable of improving autonomy of a lighting design by easily controlling light to be emitted and a lighting apparatus using the same.

Objects to be achieved from the present disclosure are not limited to the above-described objects, and other objects not described above will be clearly understood by those skilled in the art through the following descriptions.

In one general aspect, a lens assembly according to one example of the present disclosure includes a light source, a first lens part configured to focus light emitted from the light source, and a second lens part through which the light focused by the first lens part passes, the second lens part including: (i) a light-receiving surface on which fine lenses are arranged; (ii) a light-emitting surface on which fine prisms are arranged; and (iii) a pattern layer disposed between the light-receiving surface and the light-emitting surface, the pattern layer being configured to arrange the light passing through the second lens part. The arranged light is emitted through the light-emitting surface.

The pattern layer may be configured to block light incident at an angle equal to or greater than a critical angle.

The pattern layer may be formed to cover spaces between the fine lenses arranged on the light-receiving surface of the second lens part.

The pattern layer may be formed of a material comprising a resin.

The fine prisms and the fine lenses may be formed by circular patterns repeat in a radial direction.

An emission angle of light emitted from the fine prisms may be adjusted to be equal to or greater than 120 degrees.

The fine lenses, a glass layer, and the fine prisms may be stacked to form the second lens part, and the pattern layer may be formed on one surface of the glass layer.

The pattern layer may be formed on a surface of the glass layer that is in contact with the fine lenses.

In another general aspect, a lighting apparatus includes the lens assembly and a reflecting surface on which the light passing through the lens assembly may be incident. The reflecting surface may include a curved surface, and at least one of an angle or brightness of the light emitted onto the reflecting surface may be adjusted by changing an angle between an inclined surface of the fine prism and the incident light.

The light emitted from the light-emitting surface may be directed toward an end portion of the reflecting surface.

BRIEF DESCRIPTION OF THE DRAWINGS

The above and other objects, features, and advantages of the present disclosure will become more apparent to those of ordinary skill in the art by describing exemplary examples thereof in detail with reference to the accompanying drawings, in which.

Figure 1:
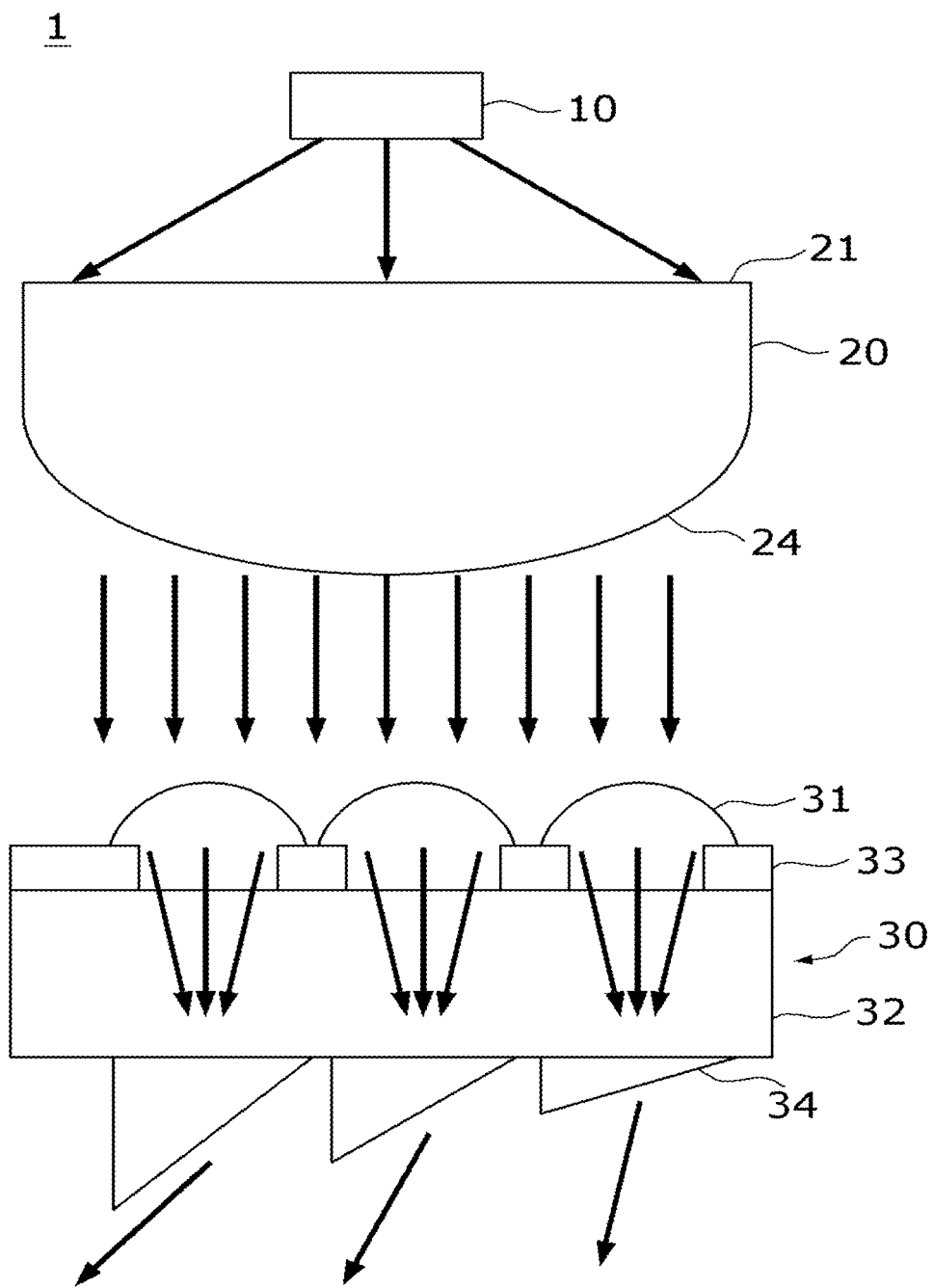
FIG. 1 illustrates a lens assembly according to one example of the present disclosure.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

Since the present disclosure may be variously modified and have several examples, specific examples will be illustrated in the accompanying drawings and described in detail. However, this is not intended to limit the present disclosure to the specific examples, and it should be appreciated that all changes, equivalents, and substitutes falling within the spirit and technical scope of the present disclosure are encompassed in the present disclosure. In the description of the examples, certain detailed descriptions of the related art will be omitted when it is deemed that they may unnecessarily obscure the gist of the present disclosure.

The use of the term "may" herein with respect to an example or embodiment, e.g., as to what an example or embodiment may include or implement, means that at least one example or embodiment exists where such a feature is included or implemented, while all examples are not limited thereto.

Terms such as "first" and "second" may be used to describe various components, but the components are not limited by the above terms. These terms are used only to distinguish one component from another.

Terms used herein are only for the purpose of describing particular examples and are not intended to limit the present disclosure. Singular forms are intended to include the plural forms, unless the context clearly indicates otherwise. In the present specification, it should be understood that the terms "comprise," "comprising," "include," and/or "including" specify the presence of stated features, numbers, steps, operations, elements, components, and/or combinations thereof but do not preclude the presence or addition of one or more other features, numbers, steps, operations, elements, components, and/or combinations thereof.

In addition, throughout the specification, when components are "connected," this may not only mean that two or more components are directly connected, but may also mean that two or more components are indirectly, physically, or electrically connected through other components, or are one component even when referred to by different names according to positions or functions thereof.

In addition, when a first component is described as being formed or disposed "on (above)" or "under (below)" a second component, such a description includes both a case in which the two components are formed or disposed in direct contact with each other and a case in which one or more other components are interposed between the two components. In addition, when a first component is described as being formed "on or under" a second component, such a description may include a case in which the first component is formed at an upper side or a lower side with respect to the second component.

Hereinafter, one example of a lens assembly 1 and a lighting apparatus including the same will be described in detail with reference to the accompanying drawings, and when the example is described with reference to the accompanying drawings, components that are the same or correspond to each other will be denoted by the same reference numerals, and a redundant description thereof will be omitted.

Many lighting apparatuses are used in a vehicle. The vehicle includes lighting apparatuses mounted on an exterior of the vehicle, such as headlamps and taillights, or lighting apparatuses mounted on components in an interior of the vehicle.

In the case of the lighting apparatus applied to the interior of the vehicle, an indirect lighting apparatus may be used so as not to degrade aesthetics of the interior of the vehicle. The indirect lighting apparatus uses light which is emitted from a light source to a specific surface and is reflected from the surface. When the indirect lighting apparatus is used, a proper level of a brightness in the interior of the vehicle may be maintained, and a luxurious interior of the vehicle may be implemented.

The indirect lighting apparatus of the interior of the vehicle may be applied to a panel, garnish, etc. applied to doors, trims, crash pads, consoles, etc.

In general, the above-described components are formed to include at least partially curved surfaces, and when light is emitted to the corresponding surface, there is concern that the light becomes focused on a specific portion or is emitted to the outside of the corresponding surface.

The present disclosure provides a lens assembly and a lighting apparatus through which a desired lighting design may be implemented by easily controlling a region, to which light is emitted, and an emission angle.

FIG. 1 illustrates a lens assembly according to one example of the present disclosure.

Referring to FIG. 1, the lens assembly 1 according to one example of the present disclosure may include a light source 10, a first lens part 20, and a second lens part 30.

The light source 10 is a component from which light is emitted. As an example, a light-emitting diode (LED) may be commonly used. A plurality of light sources 10 may be used as the light source 10, and the first lens part 20 and the second lens part 30 may also be applied as a plurality of first lens parts 20 and a plurality of second lens parts 30 to correspond thereto.

The light source 10 may be disposed to correspond to a region which needs lighting. When linear lighting is implemented on a panel or garnish provided on a vehicle door, a linear arrangement of light sources 10 may be applied such that the light sources 10 are spaced a certain distance from each other to correspond to a region provided with lighting.

When lighting is implemented in a relatively long and wide region, the plurality of light sources 10 may be disposed in an N×M arrangement. The number of each of the first lens parts 20 and the second lens parts 30 may be provided to correspond to the number of the light sources 10.

The first lens part 20 is a component which focuses light primarily. A first lens may correspond to a collimator lens. A light-receiving surface 21 of the first lens part 20 may be formed as a flat surface, and a light-emitting surface 24 may be formed as a curved surface. Light emitted by the light source 10 may pass through the first lens part 20 and may be focused primarily. As illustrated in FIG. 1, the first lens part 20 may be formed as one single lens. Unlike this, a plurality of lenses may be arranged to form the first lens part 20.

The second lens part 30 may correspond to a component which focuses the light secondarily and controls an emission angle of the light. Fine lenses may be arranged to form a light-receiving surface 31 of the second lens part 30. Fine prisms may be arranged to form a light-emitting surface 34 of the second lens part 30. A pattern layer 33 may be formed between the light-receiving surface 31 and the light-emitting surface 34.

The light-receiving surface 31 of the second lens part 30 includes a plurality of fine lenses, and each of the fine lenses focuses the incident light secondarily. The light incident through the fine lenses may be at least refracted such that an emission angle of the light is easily controlled. As an example, light incident through the fine lenses may be refracted toward the fine prisms.

The fine prisms may adjust an emission angle of emitted light. As illustrated in FIG. 1, a cross section of each of the fine prisms may be formed in a triangular shape. The fine prism includes an inclined surface having a predetermined angle with respect to incident light. The emission angle of the light emitted from the light-emitting surface may be changed by changing the angle of the corresponding inclined surface.

Since the light focused by the first lens part 20, the fine lenses, and the pattern layer 33 passes through the fine prisms, it is easy to control the emission angle using the fine prisms. An emission angle of the light may be proportional to an inclination angle of the fine prism.

Figure 2:
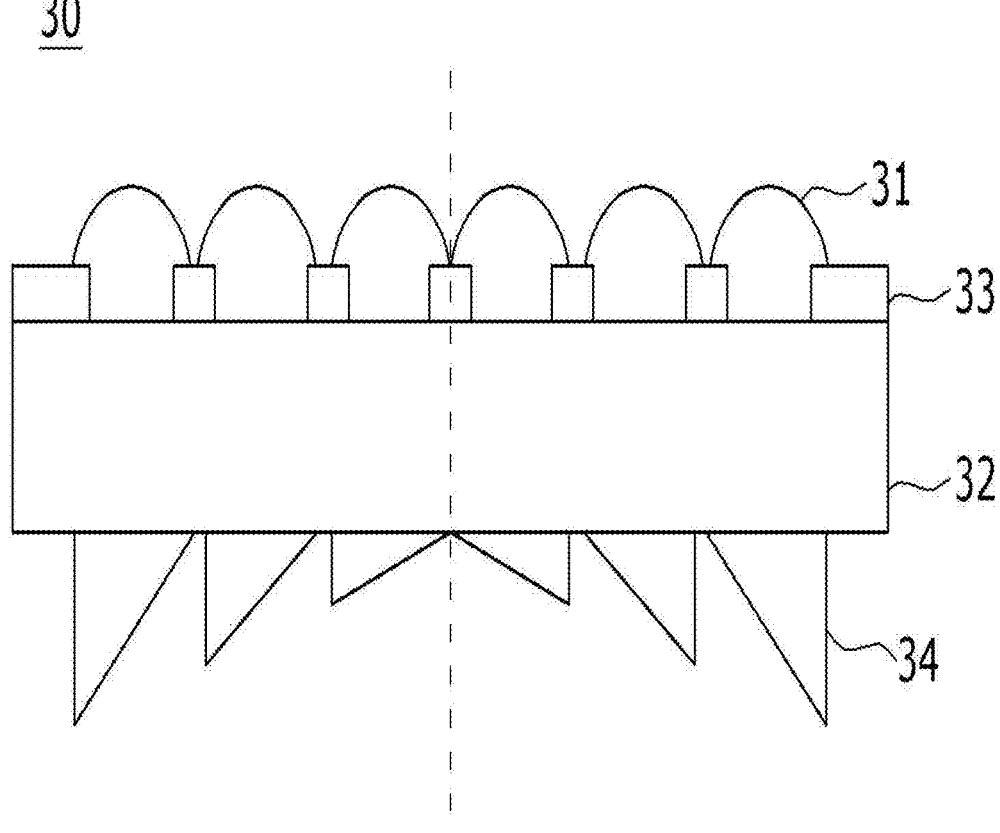
FIG. 2 illustrates a second lens part according to one example of the present disclosure.
Figure 3:
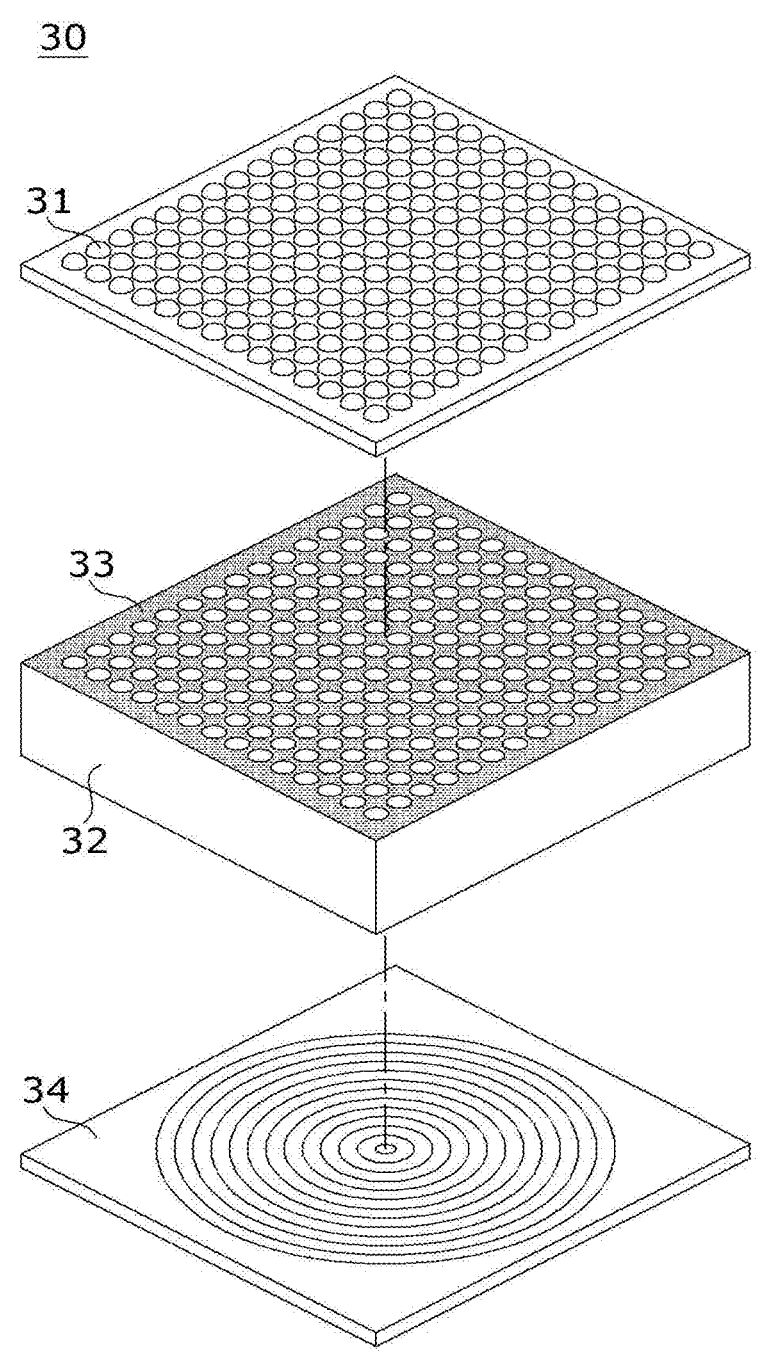
FIG. 3 illustrates an exploded view illustrating the second lens part according to one example of the present disclosure.

FIG. 2 illustrates the second lens part according to one example of the present disclosure, and FIG. 3 is an exploded view illustrating the second lens part according to one example of the present disclosure.

Referring to FIGS. 2 and 3, arrangement relationships between the fine lenses, the pattern layer 33, and the fine prisms may be shown.

The light-receiving surface 31, the pattern layer 33, and the light-emitting surface 34 may be separate components. The second lens part 30 may include the light-receiving surface 31, the light-emitting surface 34, and a glass layer 32. The glass layer 32 is a component disposed between the light-receiving surface 31 and the light-emitting surface 34. The pattern layer 33 may be formed on the glass layer 32.

As illustrated in FIGS. 2 and 3, the pattern layer 33 may be formed on one surface of the glass layer 32. The light-receiving surface 31 and the light-emitting surface 34 may be attached to both surfaces of the glass layer 32. The fine lenses may be arranged to form the light-receiving surface 31. The fine prisms may be arranged to form the light-emitting surface 34. The pattern layer 33 may be formed on a surface in contact with the light-receiving surface 31 from among both surfaces of the glass layer 32.

The pattern layer 33 may be formed of a material including a resin and attached to one surface of the glass layer 32. The pattern layer 33 may be attached to one surface of the glass layer 32, and then the light-receiving surface 31 including the fine lenses may be attached thereto.

The pattern layer 33 may be formed to cover a space between the fine lenses of the light-receiving surface 31. Referring to FIG. 3, the pattern layer 33 is formed to fill the space between the fine lenses each formed in a circular shape. Accordingly, in terms of light incident through the light-receiving surface 31, light inclined at a critical angle or more may be blocked by the pattern layer 33. Light incident in a direction perpendicular to the fine lenses of the light-receiving surface 31 or incident at a predetermined angle or less may pass through the pattern layer 33. The light passing through the pattern layer 33 may be transmitted to the light-emitting surface 34 through the glass layer 32.

The fine prisms forming the light-emitting surface 34 may include inclined surfaces having predetermined angles with respect to light proceeding through the glass layer 32 and horizontal surfaces in contact with the glass layer 32. Angles of the inclined surfaces with respect to the horizontal surfaces may be set to be different in each fine prism. The corresponding angles may be set according to a region on which light is incident.

The fine prisms may be formed such that each pattern is formed in a circular shape. The cross section of each of the fine prisms may correspond to the triangular shape, the fine prisms may extend along arcs around a center of the fine prism forming the light-emitting surface 34. The fine prisms may be prisms arranged to correspond to a plurality of concentric circles. Accordingly, cross sections of the fine prisms may have symmetrical shapes with respect to a central portion. The fine prisms, of which the cross-sectional shapes are set to be different, may be radially disposed on the light-emitting surface 34.

An emission angle of light emitted by the light source 10 may be set to be great by applying the first lens part 20 and the second lens part 30. As an example, when an emission angle of light emitted by the light source 10 is 120 degrees, an emission angle may be set to be greater than 120 degrees when the first lens part 20 and the second lens part 30 are used. Light emitted by the same light source 10 may be emitted at a higher angle, and the number of the light sources 10 to be used can be optimized.

Figure 4:
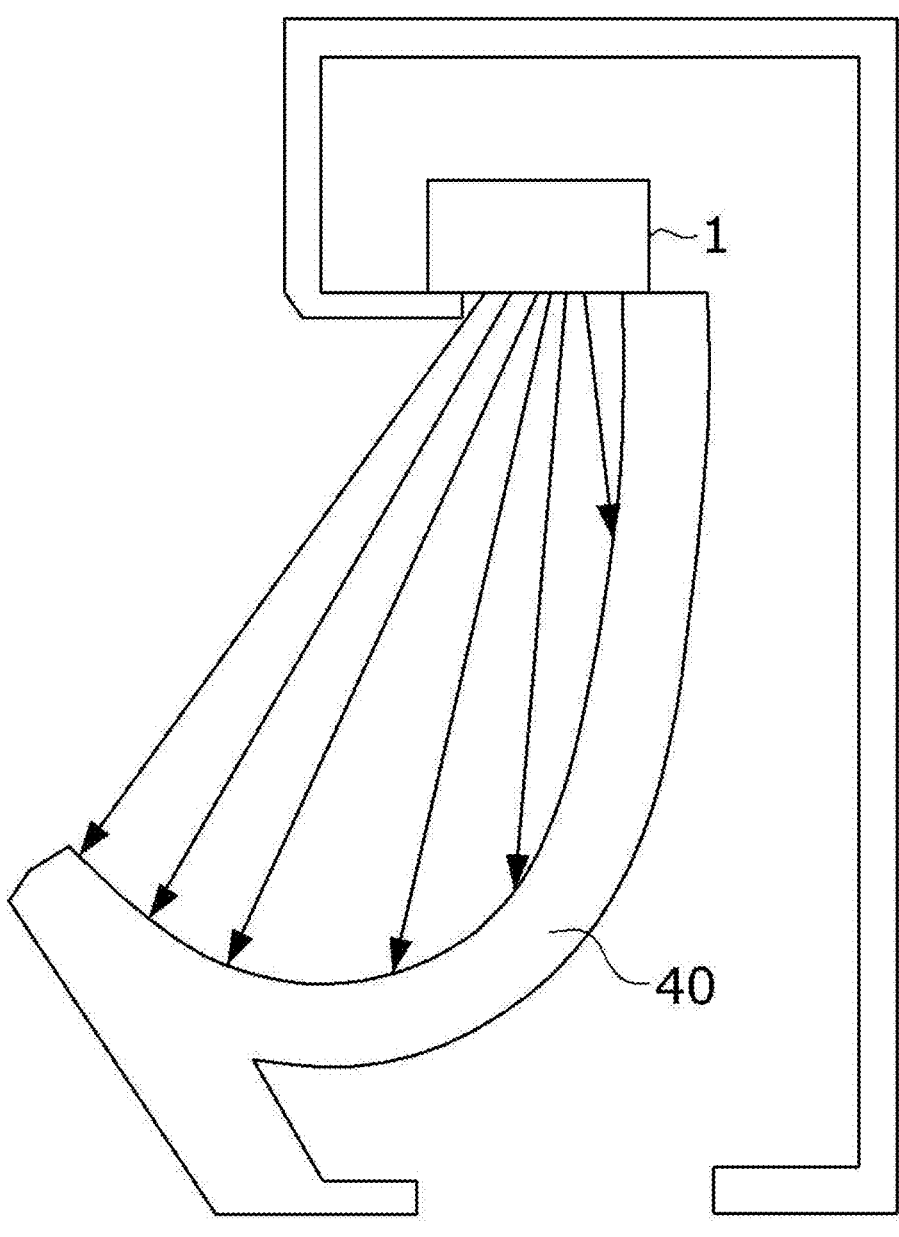
FIG. 4 illustrates a lighting apparatus according to one example of the present disclosure.

FIG. 4 illustrates the lighting apparatus according to one example of the present disclosure.

The lighting apparatus according to one example of the present disclosure may include the above-described lens assembly 1 and a reflecting surface 40 on which light passing through the lens assembly 1 is incident. The reflecting surface 40 illustrated in FIG. 4 is disposed under the lens assembly 1. The light is emitted downward from the lens assembly 1 without directly being emitted to a user. The light may be indirectly emitted through the reflecting surface 40.

The reflecting surface 40 may include a curved surface. Angles of the inclined surfaces of the fine prisms may be controlled such that light is controlled to be uniformly emitted from the curved surface. In addition, emission angles may be adjusted such that light emitted through the lens assembly 1 does not leak to the outside of the reflecting surface 40.

The reflecting surface 40 may extend from one side of the lens assembly 1. The emission angles may be adjusted such that light emitted to a region of the reflecting surface 40 adjacent to the lens assembly 1 is dispersed. The emission angles may be adjusted such that light emitted to a region of the reflecting surface 40 spaced apart from the lens assembly 1 becomes focused. Accordingly, a brightness of the light emitted from the entire region of the reflecting surface 40 may be uniformly set.

Figure 5:
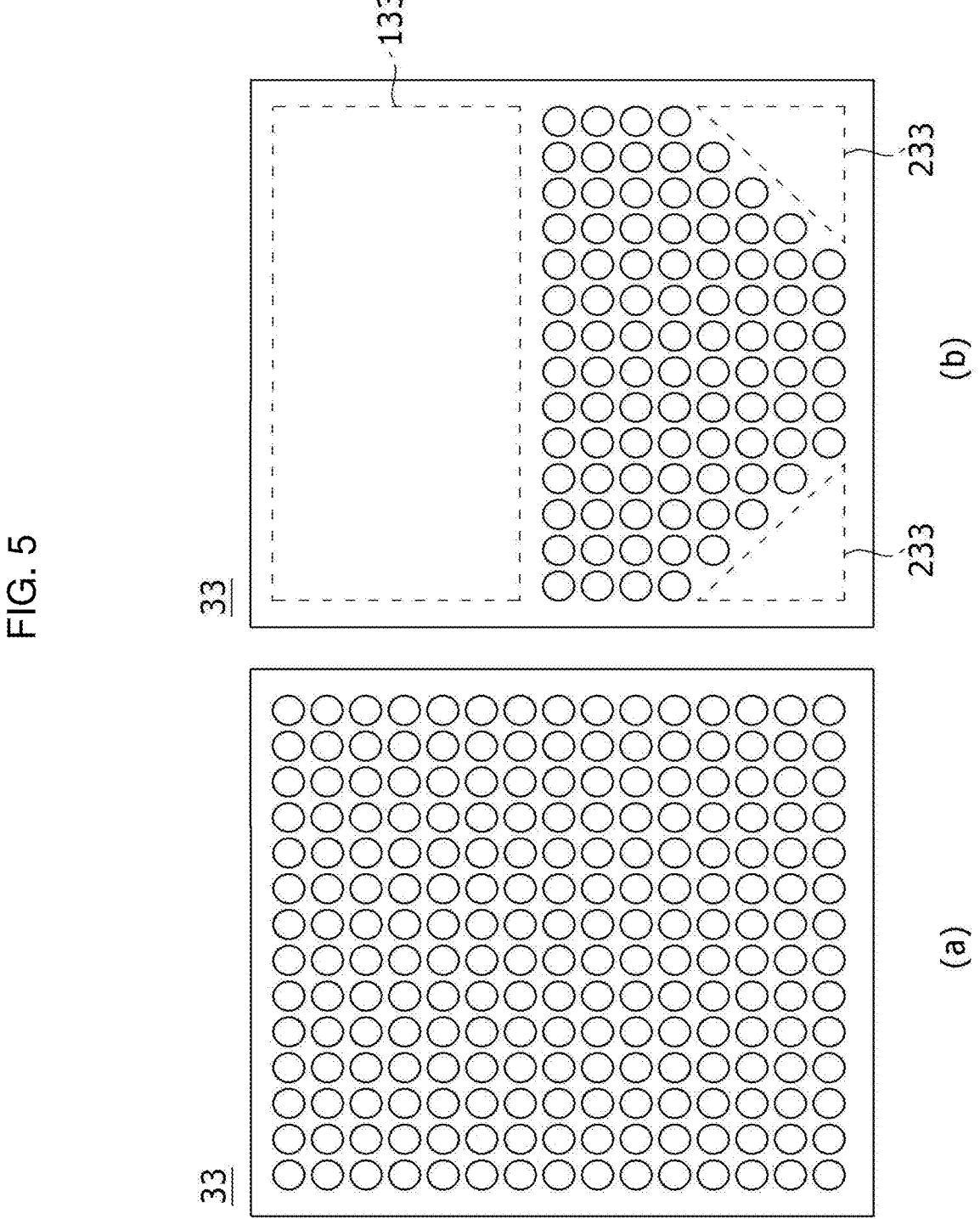
FIG. 5 illustrates a pattern layer according to another example of the present disclosure.

FIG. 5 illustrates a pattern layer according to another example of the present disclosure.

Referring to FIG. 5, a shape of a pattern layer 33 according to another example of the present disclosure may be changed and applied according to a shape of a reflecting surface 40.

Referring to FIG. 5, the pattern layer 33 may include a first region 133 through which light passes and a second region 233 which blocks light. The pattern layer 33 illustrated in FIG. 3 is formed to cover edge regions of the fine lenses. That is, the first region 133 is formed to face the fine lenses, and the second region 233 is formed to cover space between the fine lenses.

Unlike this, as illustrated in FIG. 5, the second region 233 may be formed to cover at least some of the fine lenses. When the second region 233 covers one surface of each of the fine lenses, light passing through the corresponding fine lenses is blocked by the second region 233 and does not reach the reflecting surface 40.

A shape of the second region 233 may be changed to correspond to a shape of the reflecting surface 40. The second region 233 illustrated in FIG. 5 is formed to cover the half of the fine lenses and corner regions of the remaining half which form a light-receiving surface 31.

A brightness of light emitted to the reflecting surface 40 having any of various shapes may be adjusted through a shape of the second region 233. In addition, a specific pattern of light may be emitted through a shape of the second region 233.

According to one example of the present disclosure, light can be focused secondarily using a first lens part and a second lens part, unnecessary light can be prevented from being diffused by using a pattern layer, and lighting quality can be improved.

In addition, light can be easily adjusted using the shapes of fine prisms.

Various useful advantages and effects of the present disclosure are not limited to the above-described descriptions and can be more easily understood in the detailed description of specific examples of the present disclosure.

While the present disclosure has been described above with reference to exemplary examples, it may be understood by those skilled in the art that various modifications and changes of the present disclosure may be made within a range that does not depart from the spirit and scope of the present disclosure defined by the appended claims.

What is claimed is:

1. A lens assembly comprising:
a light source;
a first lens part configured to focus light emitted from the light source; and
a second lens part through which the light focused by the first lens part passes, the second lens part comprising:
a light-receiving surface on which fine lenses are arranged;
a light-emitting surface on which fine prisms are arranged; and
a pattern layer disposed between the light-receiving surface and the light-emitting surface, the pattern layer being configured to arrange the light passing through the second lens part,
wherein the arranged light is emitted through the light-emitting surface.

2. The lens assembly of claim 1, wherein the pattern layer is configured to block light incident at an angle equal to or greater than a critical angle.

3. The lens assembly of claim 1, wherein the pattern layer is formed to cover spaces between the fine lenses arranged on the light-receiving surface of the second lens part.

4. The lens assembly of claim 1, wherein the pattern layer is formed of a material comprising a resin.

5. The lens assembly of claim 1, wherein the fine prisms and the fine lenses are formed by circular patterns repeat in a radial direction.

6. The lens assembly of claim 1, wherein an emission angle of light emitted from the fine prisms is adjusted to be equal to or greater than 120 degrees.

7. The lens assembly of claim 1, wherein:
the fine lenses, a glass layer, and the fine prisms are stacked to form the second lens part; and
the pattern layer is formed on one surface of the glass layer.

8. The lens assembly of claim 7, wherein the pattern layer is formed on a surface of the glass layer that is in contact with the fine lenses.

9. A lighting apparatus comprising:
the lens assembly according to claim 1; and
a reflecting surface on which light passing through the lens assembly is incident,
wherein the reflecting surface comprises a curved surface, and
wherein at least one of an angle or brightness of the light emitted onto the reflecting surface is adjusted by changing an angle between an inclined surface of the fine prisms and the incident light.

10. The lighting apparatus of claim 9, wherein the light emitted from the light-emitting surface is directed toward an end portion of the reflecting surface.

* * * * *